Oct. 9, 1956 R. M. GREEN 2,765,921
CRYSTAL PURIFICATION PROCESS AND APPARATUS
Filed Dec. 22, 1952 3 Sheets-Sheet 1

INVENTOR.
R. M. GREEN
BY Hudson & Young
ATTORNEYS

Oct. 9, 1956

R. M. GREEN 2,765,921

CRYSTAL PURIFICATION PROCESS AND APPARATUS

Filed Dec. 22, 1952

3 Sheets-Sheet 2

INVENTOR.
R. M. GREEN
BY Hudson and Young
ATTORNEYS

Oct. 9, 1956  R. M. GREEN  2,765,921
CRYSTAL PURIFICATION PROCESS AND APPARATUS
Filed Dec. 22, 1952  3 Sheets-Sheet 3

INVENTOR.
R. M. GREEN
BY Hudson & Young
ATTORNEYS

United States Patent Office 2,765,921
Patented Oct. 9, 1956

2,765,921

CRYSTAL PURIFICATION PROCESS AND APPARATUS

Richard M. Green, Borger, Tex., assignor to Phillips Petroleum Company, a corporation of Delaware Application December 22, 1952, Serial No. 327,380

22 Claims. (Cl. 210—150.5)

This invention relates to a process and apparatus for the separation and purification of solidifiable materials from solutions and liquid mixtures.

The process and apparatus disclosed herein are concerned with an improvement in the process and apparatus of the application of John A. Weedman, Serial No. 166,992, filed June 9, 1950, entitled "Crystal Purification Process and Apparatus." The Weedman application provides a disclosure of the first known process and apparatus for forcing a compact porous column of discrete solid material containing occluded impurities countercurrently to a melt of the pure material formed in the melting section of the column. This refluxing or washing action of the pure melt as it passes through the porous column of material effects a surprising degree of purification of the material. A product of 99.9 percent purity has been produced by Weedman's process and apparatus.

The process and apparatus of the invention appreciably increase the yield of pure product from a purification column of a given cross section as compared to the yield obtainable prior to the invention. The novel apparatus utilizes a plurality of feed arms each containing a crystal moving element and converging to one end of a crystal purification column so that a larger quantity of crystals can be fed into the purification column than is possible when utilizing a single feeding device in a continuous column of equal cross section.

The objects of the invention are several, viz.:

To provide crystal separation and purification apparatus of increased capacity and efficiency;

To provide an improved process for separation and purification of discrete solids;

To provide an improved process and apparatus for concentration of water solutions of various types by freezing out the water and washing occluded mother liquor from the ice crystals into the concentrated solution.

To improve heat exchange efficiency in the melting section of a solids purification column; and To provide other advantages which will become apparent from a consideration of the accompanying disclosure.

Figure 1:
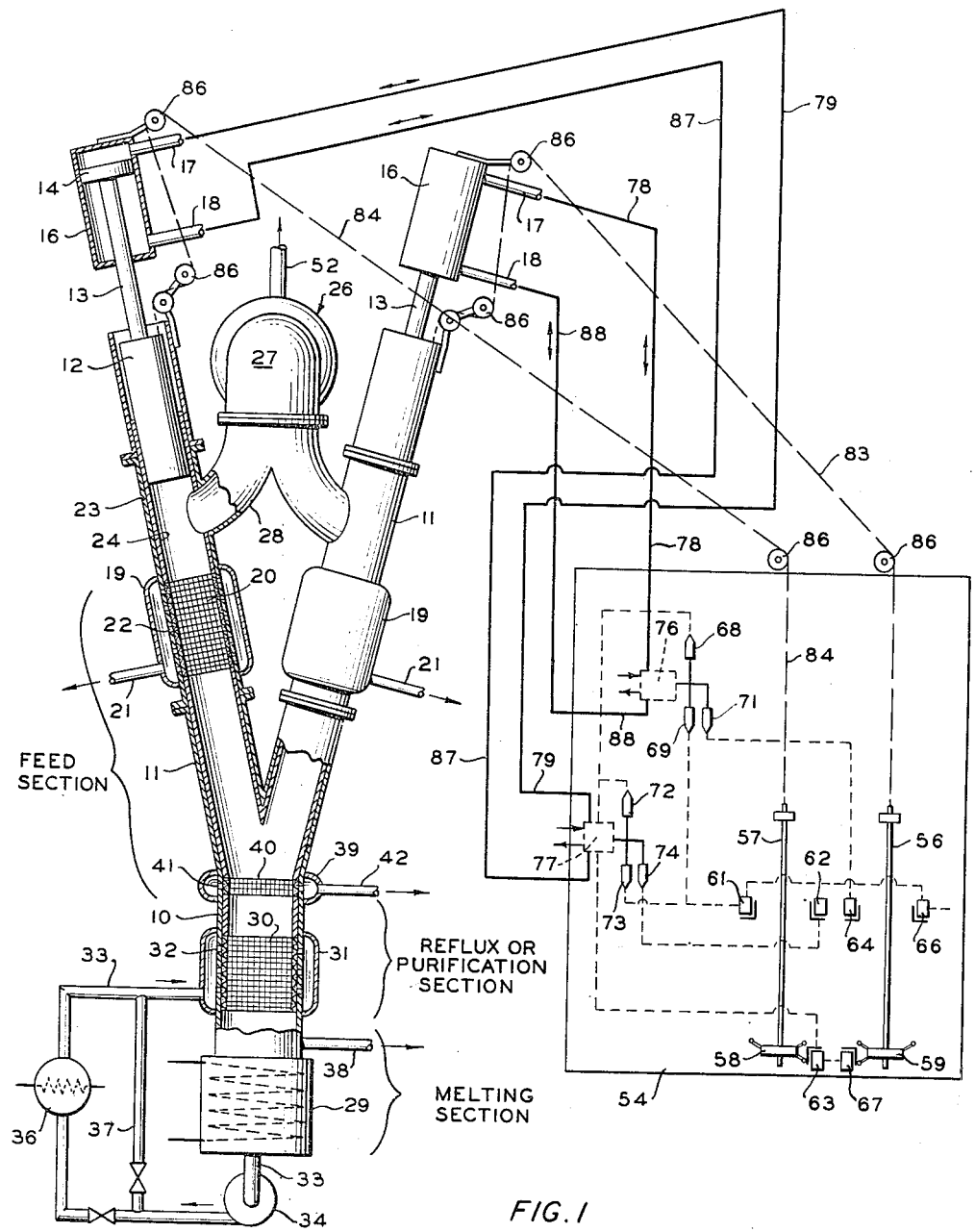
Figure 2:
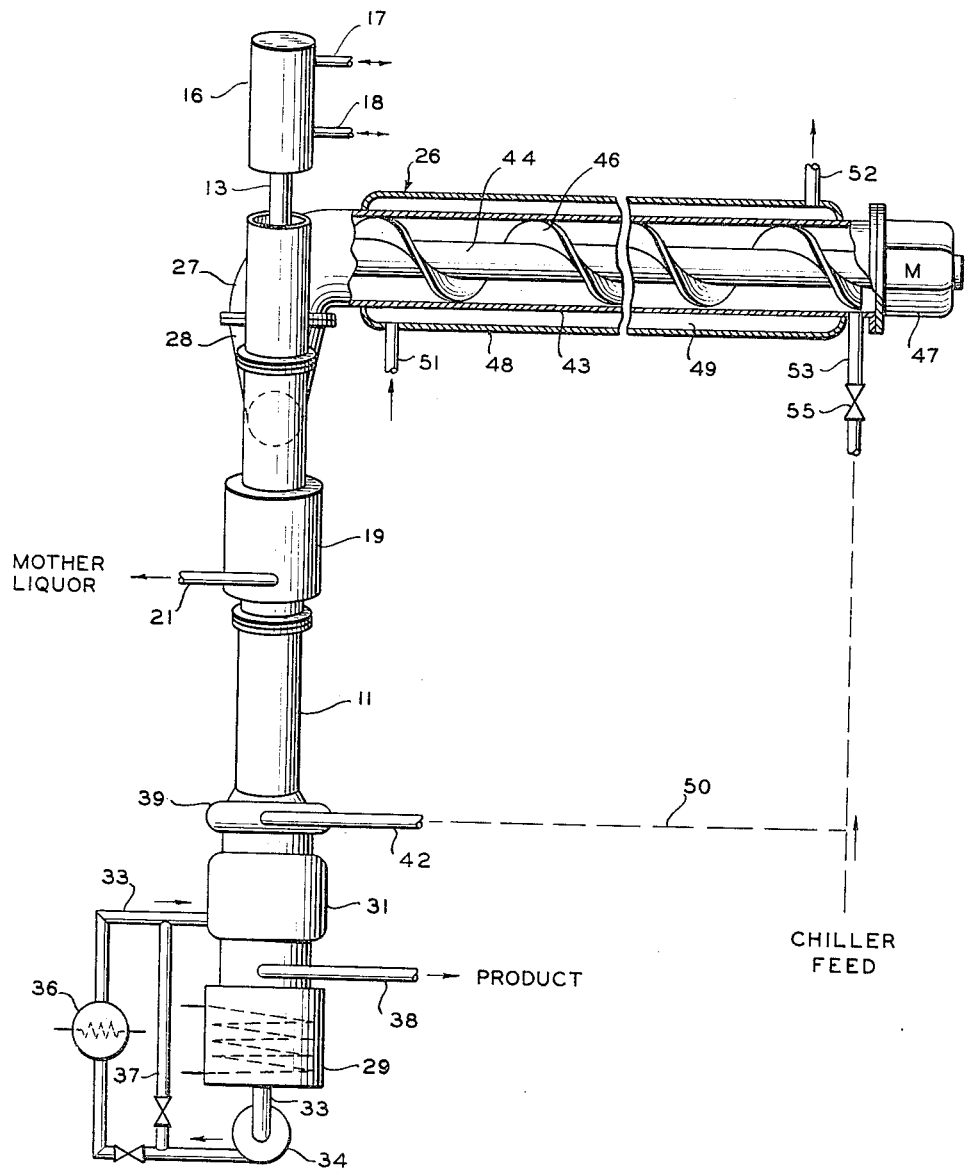
Figures 3, 4:
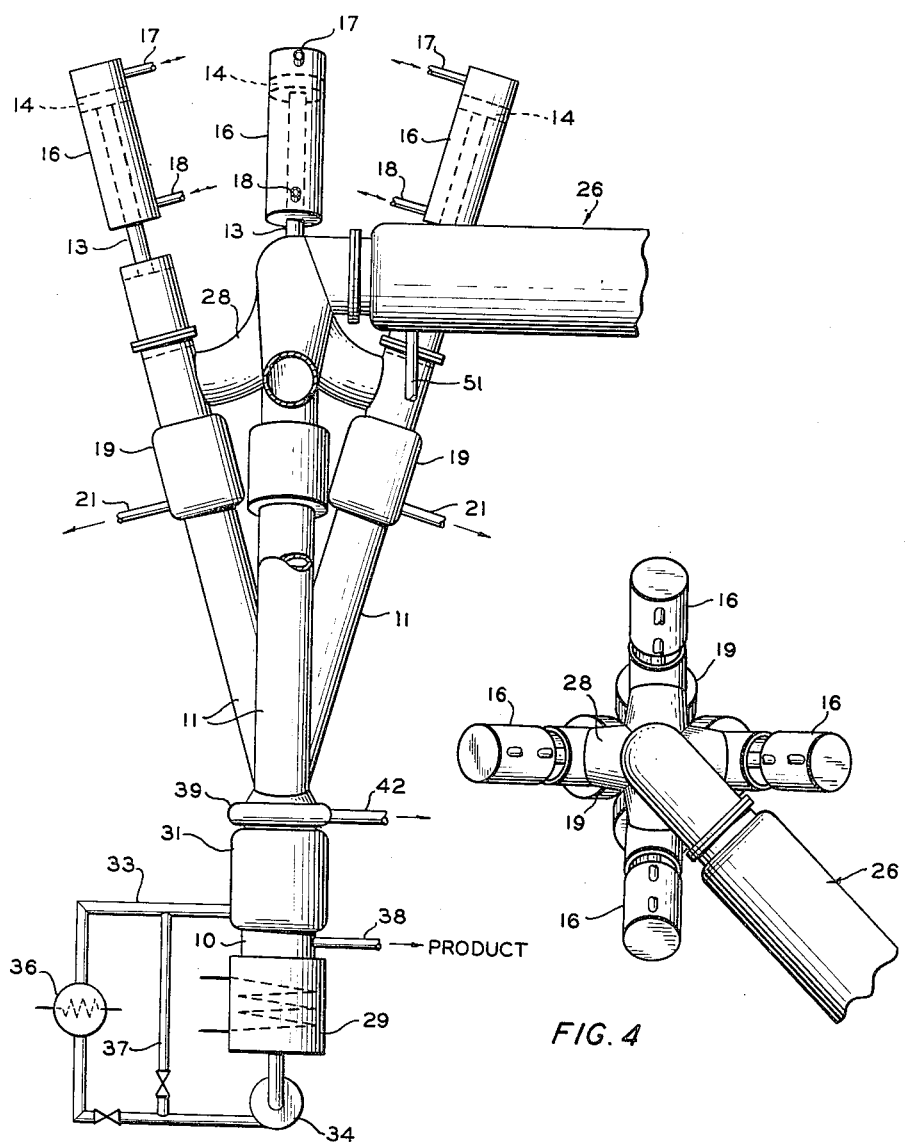

A more comprehensive understanding of the invention may be had from a consideration of the accompanying drawing of which Figure 1 is a side elevation, partly in section and partly diagrammatic, of one form of solid or crystal separation and purification apparatus of the invention; Figure 2 is an end elevation, partly in section, of the apparatus of Figure 1; Figure 3 is a side elevation of another modification of the apparatus showing four feed arms; and Figure 4 is a top view of the apparatus of Figure 3.

Referring to Figure 1, numeral 10 refers to a cylindrical purification column containing a melting section in the lower end and a washing or purification section in the upper end thereof. A pair of feed arms 11 in the form of a V are joined to the upper end of column 10 in open communication therewith so that each feed arm forms a continuous column with cylinder 10. Each feed arm 11 has an impervious piston 12 in the form of a hollow or solid cylinder in the upper end thereof connected by a connecting rod 13 to a hydraulic piston 14 in hydraulic cylinder 16. Lines 17 and 18 serve to pass hydraulic fluid alternately into and out of cylinder 16 so as to drive piston 14 and therefore piston 12. Each feed arm is provided with a filter section comprising a bustle ring 19 having a take-off line 21, and a filter screen 20 together with openings 22 in the feed arm wall permitting passage of liquid from the crystal mass through the wall of the feed arm without permitting the crystals to flow through the wall. Liquid or mother liquor is withdrawn through line 21 for suitable disposition. Holes 22 and screen 20 in the feed arm wall are merely illustrative of any type of filtering device which passes liquid through the wall without permitting the crystals to pass through. It has been found that various types of metallic screens of suitable mesh, welded in sections into the feed arm wall, serve excellently as filtering means. The feed arms and the purification section of the column are fabricated from any suitable steel or other metal conduits or piping 23 and are preferably lined with a smooth brass, stainless steel, or other suitable lining 24.

A crystallizer in the form of a scraped surface chiller 26 is connected by means of an elbow 27 and a branched conduit 28 to the feed arms 11 at a level below the lower end of piston 12. Any other crystal forming device with a suitable crystal mover may be utilized as chiller 26.

Purification column 10 has a heat exchanger 29 in communication with the lower end of the column. This heat exchanger may comprise an electric resistance heater, an internal heat exchanger, or an indirect heat exchanger utilizing a hot heat exchange fluid. A filter section 31 in the wall of column 10 above the melting section of similar construction to the filters 19 in feed arms 11 is provided. A filter means comprising screen 30, holes 32, and the surrounding bustle ring permits passage of recycle liquid from line 33 through the wall of the column. Line 33 connects with the lower portion or end of the melting section and by means of pump 34 provides for withdrawal of melt from the bottom of the column and injection of the melt into the column through openings 32. A heat exchanger 36 in line 33 permits additional heating of the recycle stream introduced to the column through filter 31. When operating under conditions which do not require heat exchanger 36, the recycle stream is passed through line 37. Line 38 is a product take-off line from the melting section. A bustle ring 39 surrounding openings 41 and screen 40 in the wall of column 10 above filter 31 provides for withdrawal of a liquid stream through line 42.

Figure 2, which is an end elevation of the column of Figure 1, shows a side view of the crystallizer 26 in cross section having corresponding elements designated by the same numerals as utilized in Figure 1. The crystallizer comprises a cylindrical inner section 43 containing an axially disposed shaft 44 having mounted thereon a helix or screw 46. The screw or auger 46 is actuated by motor 47 or other suitable means on the outer end of the shaft. A jacket 48 surrounds inner cylinder 43 in spaced-apart relation to provide for heat exchange fluid in annular space 49.

Lines 51 and 52 serve to introduce and withdraw heat exchange fluid or coolant, such as expanding liquid propane, to and from the chiller. Numeral 53 designates a feed inlet to chiller 26. A line 50 connects line 42 with chiller feed line 53 for conducting reflux recycle from the purification column to the chiller. A check valve 55 in line 53 increases the column capacity by checking back flow of feed during the compression stroke of the pistons. Instead of being disposed in a horizontal position chiller 26 may be disposed obliquely or vertically so that the auger feeds the crystals downwardly through feed inlets 28 into arms 11. Of course it is not essential to maintain the column in upright position as it is operable in any position, but the vertical position is preferred.

Figures 3 and 4 show a crystal purification column utilizing a group of four feed arms served by a common chiller. However, any required number of chillers may be used to supply the feed arms. The elements of the apparatus shown bear the same numeral designation as is utilized in Figures 1 and 2. These figures should be self-explanatory after consideration of Figures 1 and 2.

Referring again to Figure 1, a control panel 54 with the hereinafter described arrangement of elements coordinates the movement of the pistons in the feed arms. The arrangement shown is set up to operate the column pistons in the two feed arms in phase, i. e., simultaneously on compression stroke and simultaneously on back stroke so that both begin the corresponding strokes simultaneously. The motion of the feed pistons is reproduced mechanically on the control panel by rods 56 and 57 to which are attached crossheads 59 and 58, respectively. Crossheads 58 and 59 contact air valves 61, 62, 63, 64, 66, and 67 at various points in the cycle of operation. The air valves when operated by crossheads 58 and 59 supply air to pistons 68, 69, 71, 72, 73, and 74. These pistons are connected mechanically to a pair of 4-way hydraulic control valves 76 and 77 in a manner permitting the pistons to operate the 4-way valves and control the motion of the hydraulically driven pistons 14 in cylinders 16.

The control panel may be arranged to operate the two pistons independently, coordinated in phase, or coordinated but out of phase (operating alternately). The preferred cycle of operation is as follows. When both pistons are at the top of their strokes, the crossheads 58 and 59 are in contact with air valves 63 and 67, respectively. The feed arms are charged with slurry through branch conduits 28 and air is relayed through valves 63 and 67 to air pistons 68 and 72 which operate control valves 76 and 77, respectively, so as to move the feed arm pistons downwardly by means of hydraulic fluid in lines 78 and 79, respectively. As the pistons move downwardly, 56 and 57 are moved upwardly on the control panel by means of cables 83 and 84, respectively, attached to pistons 12 and operating over a series of pulleys 86. As the pistons in the feed arms reach the end of the downstroke, assume that the left piston whose movement is simulated by rod 57 reaches the end of the stroke first. In this instance, crosshead 58 contacts and operates air valve 62 so as to relay air to piston 74 thereby neutralizing valve 77 and stopping the motion of the left piston by cutting off the fluid supply to line 79. At the same time, crosshead 58 operates air valve 61 which is in series with air valve 66 and will not operate until the latter is also opened. Then as the right piston reaches the end of its downward stroke, crosshead 59 operates air valve 66 and air is relayed through valves 66 and 61 to air pistons 69 and 73 thereby operating hydraulic control valves 76 and 77 so as to pass hydraulic fluid through lines 87 and 88, respectively. The cycle then repeats. It should be noted that arrangement of air valves 61 and 66 in series coordinates the feed arm pistons at the bottom of the strokes and, similarly, air valves 63 and 67 arranged in series operate to coordinate the feed arm pistons at the top of their strokes. In order to operate the feed arm pistons alternately, air valves 63 and 66 are arranged in series while air valves 61 and 67 are arranged in series in the same air line. Air valve 64 operates through air piston 71 to neutralize 4-way valve 76 when the right feed arm piston reaches the end of the downstroke before the other feed arm piston in the same manner as air valve 62 operates in the event left feed arm piston reaches the end of its downstroke first.

Other devices may be utilized in the control of hydraulic pistons 14 and the feed arm pistons 12 so as to operate them in phase or alternately as desired. Electrically or electronically controlled valves may be utilized to coordinate the motion of the feed arm pistons but special precaution must be taken when working with hydrocarbons in order to avoid the possibility of explosion or fire. Another method of synchronizing the movement of the feed arm pistons is disclosed in the application of E. E. Rush, Serial No. 348,347, filed April 13, 1953, entitled "Crystal Purifier Control System." Another device which may be utilized for such control is set forth in U. S. Patent 2,528,131, issued October 31, 1950, to O. L. Garretson.

In operating the apparatus to perform the process of the invention, a suitable feed containing a crystallizable material is introduced to chiller 26 through line 53. A suitable refrigerant, such as liquid propane, is expanded into cooling jacket 48 through line 51 so as to reduce the temperature of the feed sufficiently to crystallize a substantial amount of the higher melting component. Crystals and mother liquor formed in the chiller or crystallizer are moved by means of auger 46 through elbow 27 and branched conduit 28 into the feed arms below the pistons 12. Pistons 12 are forced downwardly by means of the hydraulic pistons as described hereinbefore so as to force the crystals and mother liquor downwardly in the feed arms. Because of the pressure in the feed arms due to the relatively slow withdrawal of product through line 38 from the melting section, mother liquor is forced out through filter openings 22 in filters 19 and the crystals are pushed or forced downwardly in the feed arms so as to form a relatively compact column or plug of crystals in the feed arms below the filter and in the upper section of the purification column 10. Repeated operation of the feed arm pistons establishes and maintains a compact porous column of crystals extending down the feed arms and into the upper portion of the melting section of column 10. Heater 29, alone, or together with heat exchanger 36 in line 33, maintains a melt of crystals in the lower portion of the column, and proper control of withdrawal of product through line 38 forces any desired portion of the melt upwardly through the porous column of crystals as reflux. A reflux stream is removed from the column of crystals through filter openings 41 into collecting ring 39 for withdrawal through line 42. It is desirable to recycle this reflux stream containing a higher melting component and a minor amount of lower melting components of the feed to feed line 53. However, any suitable disposal of this reflux stream may be made.

In one modification of the process, the reflux passing upwardly through the purification column and the mother liquor ordinarily taken off through line 21 may be taken off through the same filter section and this filter section may be disposed either in the upper end of purification column 10 or in the feed arms as shown in the drawing. In other words a single filter in the upper end of column 10 can be utilized to remove both the mother liquor from the slurry of crystals and the relatively rich reflux which is forced upwardly through the column of crystals. Alternatively, particularly, where the reflux stream is small and its recovery as such is not important, the filters in the feed arms may be utilized to remove both mother liquor and reflux without the use of filter means 41. It is also feasible to utilize a filter in the upper section of column 10 which is divided into a relatively small lower section and relatively large upper section, by means of a partition in bustle ring 39 with removal of the reflux through the lower section of the filter and mother liquor from the upper section. Recycle line 33 and filter 31 may be omitted from the apparatus and the column will function adequately, but less efficiently.

While the column can be operated with good results without the use of a recycle stream through line 33, it is found that in columns suitable for commercial operation the use of recycle line 33 and heat exchanger 36 increases the heating efficiency of the melting section as well as the heat distribution therein.

The following example illustrates the application of the process and apparatus to a specific separation and purification problem.

EXAMPLE

A feed of the following liquid volume percent composition,

| | |
|---|---|
| Cyclohexane | 84.8 |
| Methylcyclopentane | 0.8 |
| Benzene | 0.007 |
| 2-methylhexane | 2.0 |
| 2,2-dimethylpentane | 2.4 |
| 3,3-dimethylpentane | 0.8 |
| 2,4-dimethylpentane | 6.2 |
| 2,3-dimethylpentane | 1.0 |
| 1,1-dimethylcyclopentane | 2.0 | which is a commercial cyclohexane stream, was introduced to an apparatus similar to that of Figure 1 at a temperature of 90° F. to chiller or crystallizer 26 through line 53. The temperature of the chiller jacket was maintained at −41° F. by expanding liquid propane therein so as to produce a slurry of crystals and mother liquor at a temperature of −39° F. This slurry was forced into feed arms 11 and the crystals and mother liquor were forced downwardly in the feed arms. Mother liquor containing approximately 70 weight percent cyclohexane was removed through lines 21 and the crystals were forced in the form of a compact porous column into the purification column 10. A melt temperature of 100° F. was maintained in the lower end of column 10 and a recycle ratio in the range of 4:1 to 5:1 volumes of recycle in line 33 per volume of product in line 38 was utilized. The ratio of reflux in line 42 to product in line 38 was maintained in the range of 0.05:1 to 0.20:1 and the concentration of cyclohexane in this stream was about 90 weight percent. A product of 98 plus mol percent cyclohexane at the rate of more than 35 gallons per hour was taken off through line 38.

During the development of the apparatus and process, it was believed that alternate operation of the pistons in the two feed arms of Figure 1 would result in greater yields of product than would be obtained by operating the pistons in phase. In order to increase the efficiency of alternate piston operation, shuttle valves were installed in each feed arm between the feed arm filter and the juncture of the feed arms and suitable operating mechanism was devised to close these shuttle valves alternately when the piston in the opposite feed arm was on the compression stroke. However, it was found that the shuttle valves were unnecessary because operation of the pistons in phase resulted in higher capacity than alternate operation of the pistons as shown by the ensuing data.

Runs were made with apparatus of the design shown in Figure 1 with the addition of shuttle valves in the feed arm as described above and using a commercial cyclohexane feed of the approximate composition of that set forth in the example above. In one run the pistons were operated alternately and 17.4 G. P. H. of 97.9 mol percent cyclohexane were produced. In a second run under comparable conditions the pistons were operated in phase and 24.0 G. P. H. of 98.1 mol percent cyclohexane were produced.

Various improvements in the apparatus and operation thereof were made to increase the capacity of the column. Installation of a check valve in the hydrocarbon feed line of the chiller increased the column capacity so that in a succeeding run 35.8 G. P. H. of 98.0 mol percent cyclohexane were produced. In the previous run which produced 35.8 G. P. H. of cyclohexane the chiller auger was operated at 26 R. P. M. It was found that by increasing the auger rotation rate to 32 R. P. M. a product rate of 43.2 G. P. H. of 97.4 mol percent cyclohexane resulted. A run was made on cyclohexane purification using 85 volume percent commercial cyclohexane feed in which 45.2 G. P. H. of 97.7 mol percent cyclohexane were obtained. The chiller auger rotation rate was 50 R. P. M., the feed rate 127 G. P. H., and the mother liquor take-off was 82.0 G. P. H. All of the previously described runs were made in a column having 4″ I. D. feed arms and 4″ I. D. purification column.

In cyclohexane purification it was observed that a dense plug of crystals was formed in the feed arms and these emerged into a similar dense plug in the purification column which was of the same diameter as the feed arms. A 6″ I. D. by 8″ long glass reflux section was installed in the column in order to determine whether the 4″ diameter crystal plug emerging from the feed arm would expand immediately to fill the larger cross-sectional area of the purification section. It was found that the 4″ diameter crystal plug from the feed arm expanded so as to completely fill the 6″ diameter reflux section and there was no evidence of channeling noted. Using the 6″ diameter reflux section two runs were made at feed rates of 76.5 G. P. H. of commercial cyclohexane and 87.1 G. P. H., respectively. The mother liquor flow rates were 43.6 and 46.6 G. P. H., respectively. The yields in the two runs were 32.0 G. P. H. of 98.4 mol percent cyclohexane and 37.4 G. P. H. of 98.0 mol percent cyclohexane, respectively. The rate of rotation of the chiller auger was the same in each run.

A study was made of the effect of reflux ratio on product purity. Runs were made in purifying cyclohexane from an 85 percent commercial cyclohexane feed with reflux ratios of 0.06 and 0.64. In the first run the product purity was 98.2 mol percent while a product of 98.1 mol percent was obtained in the second run.

In order to determine the effect of the feed purity on high melting product purity feed stocks of varying purities were made by blending 99 mol percent cyclohexane with isooctane. The data obtained in these runs are presented in Table I.

Table I

PRODUCTION OF 99.0 MOL PERCENT CYCLOHEXANE

| Feed Purity | Rates, gal./hr. | | | Product Purity, Percent | Cyclo- C₆H₁₂ Percent Yield |
|---|---|---|---|---|---|
| | Product | Feed | Mother Liquor | | |
| 84.4% | 16.0 | 52.7 | 36.4 | 99.0 | 35.9 |
| 89.6% | 34.6 | 81.6 | 45.6 | 99.0 | 47.1 |
| 93.8% | 37.2 | 79.3 | 40.6 | 99.5 | 50.6 |
| 93.8% | 43.2 | 102.5 | 58.6 | 99.3 | 44.1 |
| 84.3% | 14.8 | 40.0 | 25.0 | 98.2 | 42.7 |

An extended run lasting 118 hours was made in the apparatus of the invention utilizing 85 percent commercial cyclohexane feed. The yield of 98 plus mol percent of cyclohexane obtained was in the range 22 to 26 G. P. H.

Process control of the column is very simple as the only control required is the matching of the heating load at the base of the column to the refrigerating load on the chiller. Rates through the entire unit are determined indirectly by adjustment of the rate of heating at the base of the column. Chilling capacity is controlled principally by regulation of the temperature of the refrigerant in the chiller shell.

A number of surprising facts were brought to light in the development and operation of the apparatus of the invention. It is quite surprising that a reflux section of only 5 inches length in a 4″ I. D. column provides all of the reflux space required in producing a 99 mol percent product. It is also surprising that a reflux ratio in the range of .01 to 1.0, for example, a ratio of 0.05 to 0.1 is sufficient to effect a purity in the product of 99 mol percent and higher. In view of the fact that the ratio of the volume of the reflux stream to the volume of the mother liquor stream is only about 0.05 to 1.0, it is possible to utilize a reflux filter area in the wall of the reflux section which is very small as compared with the filter area of the mother liquor take-off filter. This is an important factor in designing the column in view of the fact that the inside of the column including the feed arms should be as smooth as possible and therefore the filter screen should be as small as is consistent with good operation without limiting the capacity of the column.

Smoothness of the interior walls of the column is a critical feature of the apparatus inasmuch as roughness in a sizable proportion of the walls cuts down the capacity of the column very markedly. The first column operated was fabricated from ordinary steel piping and the filter areas were larger and rougher than necessary. By insertion of smooth brass liners in the feed arms and in the purification section of the column down as far as the melting section and by adjusting the filter areas as small as consistent with efficient operation, the capacity of the apparatus was more than doubled and the power requirement for forcing the crystal plug through the apparatus was greatly reduced. This seems like a small advantage but when the pressure required for forcing the plug through the column is of the order of 300 to 400 pounds per square inch the saving can be appreciable.

The capacity of the crystal separation and purification column to produce substantially pure product is amazing. The recovery of more than 40 gallons per hour of approximately 98 mol percent cyclohexane from a feed containing 85 volume percent cyclohexane from a 4" I. D. column is rather astounding. Results of operating the 4 and 6" I. D. purification columns over an extended period indicate that commercial operation at the rate of upwards of 300 G. P. H. per square foot of cross-sectional column area with a product purity of more than 98 mol percent is feasible.

The apparatus and process in question are applicable to the separation of various hydrocarbon systems including the systems disclosed in the Weedman application identified hereinbefore. These have been applied to the up-grading of paraffins, for example, the production of 95 mol percent decane from an 83.5 mol percent decane concentrate obtained by fractional distillation of naphtha. The apparatus and process are also particularly applicable to the separation of the paraxylene from a mixture of the xylenes containing only 15 to 20 percent of the para isomer to produce 99 plus mol percent paraxylene at comparable rates to the production of cyclohexane.

Other applications of the process and apparatus are in the concentration of various water solutions such as fruit juices, liquors of all types which contain water and from which ice crystals separate so as to leave a concentrated mother liquor. The ice crystals are separated from the mother liquor and washed free of occluded impurities which are recovered in the mother liquor. Any solid material which does not become impervious under pressure may be washed free of occluded material in order to recover the solid material in more nearly pure form or to recover the extracted material. A solvent or extractive liquid may be introduced into the warm end of the column in order to wash desired components from the solid material. Extraction of cottonseed and soy beans are illustrative of this type of process.

The illustrative details set forth herein are not to be construed as imposing unnecessary limitations upon the invention, the scope of which is set forth in the claims.

I claim:

1. Apparatus for separation and purification of a solid material comprising in combination an elongated pistonless cylindrical column having a closed end and an open end; heating means providing a melting section in said closed end for melting crystals; a product outlet at said closed end; a filter section in the wall of said column near its open end for withdrawing liquid reflux; a plurality of elongated cylindrical feed arms in communication with the open end of said column; a reciprocable close-fitting piston in each feed arm; a feed inlet in each feed arm between said piston and said column for introducing a slurry of solid material thereto; and a filter section in the wall of each feed arm between said feed inlet and said column for withdrawing mother liquor.

2. Apparatus for crystal separation and purification comprising in combination an elongated pistonless upright cylindrical column having a closed bottom end and an open upper end; heating means providing a melting section in said closed end for melting crystals; a product outlet adjacent said closed end; a filter section in the wall of said column near its open end for withdrawing liquid reflux; a plurality of elongated cylindrical feed arms directed toward and in communication with the open end of said column forming a top closure therefor; a reciprocable close-fitting piston in each feed arm; a feed inlet in each feed arm below said piston in the pre-compression position but above same in the forward position for introducing crystals to said feed arm; and a filter section in the wall of each feed arm between said feed inlet and said column for withdrawing mother liquor.

3. The apparatus of claim 2 including a freezer in communication with the feed inlets in said feed arms.

4. Apparatus for crystal separation and purification comprising in combination an elongated pistonless cylindrical column having a closed end and an open end; heating means providing a melting section in said closed end for melting crystals; a product outlet adjacent said closed end; a filter section in the wall of said column near its open end for withdrawing liquid reflux; a plurality of elongated cylindrical feed arms directed toward and in communication with the open end of said column forming a closure therefor; a reciprocable close-fitting piston in each feed arm; a feed inlet in each feed arm between said piston in the pre-compression position and said column for introducing crystals to said feed arm; a jacketed cylindrical freezer having a feed inlet, a crystal outlet, and a screw-type scraper therein for scraping crystals off the wall thereof, said freezer being in communication at its delivery end with the feed inlets in said arms; and a recycle line connecting the filter in said column with the feed inlet to said freezer.

5. The apparatus of claim 2 including a liquid recycle line connecting the lower end of said column with an inlet in said column intermediate said melting section and the filter in the wall of said column.

6. The apparatus of claim 5 including a heat exchanger in said recycle line.

7. The apparatus of claim 2 including reciprocating means connected with said pistons.

8. Apparatus for crystal separation and purification comprising in combination an elongated pistonless cylindrical column having a closed bottom end and an open upper end; heating means providing a melting section in said closed end for melting crystals; a product outlet at said closed end; a filter section in the wall of said column adjacent its open end for withdrawing liquid; a plurality of elongated cylindrical feed arms directed toward and in communication with the open end of said column forming a top closure therefor; a crystal mover in each feed arm; and a feed inlet in each feed arm between said crystal mover and said column for introducing a slurry of crystals thereto.

9. The apparatus of claim 8 including a reciprocable close-fitting piston as said crystal mover and reciprocating means connected with said piston.

10. The apparatus of claim 9 in which said reciprocating means comprises a fluid-actuated piston.

11. Apparatus for crystal separation and purification comprising in combination an upright pistonless cylinder having a closed bottom end and an open upper end; heating means in communication with said closed end providing a melting section for melting crystals; a product outlet in said melting section; a plurality of elongated tubular feed arms downwardly and obliquely directed toward and in communication with the open upper end of said cylinder so as to form a closure therewith, said feed arms and said upright cylinder forming a separation and purification column; feeding means in each feed arm for forcing solid discrete particles and liquid into said upright cylinder; at least one filter in said column for separating and removing liquid from said column; and a feed inlet in each feed arm intermediate said feeding means and said filter.

12. The apparatus of claim 11 which includes filters in each of said feed arms.

13. The apparatus of claim 12 which includes a filter in said upright cylinder.

14. The apparatus of claim 11 in which the cross sectional area of said upright cylinder is larger than that of any one of the individual feed arms.

15. Apparatus for crystal separation and purification comprising in combination an upright column having a closed bottom end and crystal moving means in the upper end thereof; a feed inlet in said column below said crystal moving means; heat exchange means in communication with the lower end of said column for maintaining a melting section therein; a product take-off line in the lower end of said column; a filter in said column between said feed inlet means and said melting section; and a product recycle line leading from the lower portion to the upper portion of said melting section.

16. A process for recovering a solid material from a solid-liquid mixture, comprising introducing said solid-liquid mixture into a plurality of compression cylinders converging to a common separation column; compressing said mixture toward said column and simultaneously withdrawing liquid from said cylinders so as to form a compact mass of solids in said cylinders and in the column end adjacent said cylinders; continuing the introduction of said mixture and the compressing step so as to maintain a compact mass of solids in said cylinders and in said column; maintaining a melting section in the end of said column opposite the feed end so as to continuously melt the mass of solids in said melting section; continuously withdrawing a portion of the melt; continuously refluxing another portion of the melt by displacement thereof with the incoming solids so as to force the reflux melt through a portion of said mass of solids and increase the purity of same; and withdrawing reflux from a section of said column opposite the melting section.

17. The process of claim 16 in which the compressing step in each compression cylinder is in phase with that in each of the others.

18. The process of claim 16 in which the compressing steps in the cylinders are performed in sequence so as to constantly feed crystals to said column.

19. A process for purifying discrete crystals including impurities, comprising forcing said crystals through a plurality of conduits into a purification column so as to form a compact mass of said crystals in the form of a dense porous plug in said conduits and in said column; maintaining a melting section in the end of said column opposite the feed end; forcing said dense porous plug in said column into said melting section so as to continuously melt the forward end thereof; withdrawing a portion of the resulting melt as a product; forcing a portion of said melt upwardly through said dense porous plug as a reflux so as to purify the crystals therein; and withdrawing said reflux from said crystals after same has passed through at least a portion of said porous plug.

20. The process of claim 16 in which said purification column is upright and a portion of said melt is withdrawn from said melting section and is introduced to said column at a higher level in said column below the level of reflux withdrawal.

21. A process for separating a liquid mixture into two streams each of higher concentration of different components than said mixture, which comprises freezing out a substantial proportion of one component so as to form a slurry of crystals in mother liquor; forcing resulting slurry through a plurality of conduits into a purification column so as to form a dense porous plug of crystals occupying the entire cross section of said column and the section of each said conduit adjacent said column; continuously melting the forward end of said plug of crystals to form a melt; forcing a portion of said melt countercurrently to said crystal plug as reflux; withdrawing the remaining portion of said melt from said column in front of the forward end of said plug; and withdrawing mother liquor and reflux from said column upstream of the forward end of said plug.

22. The apparatus of claim 15 including heat exchange means in said product recycle line.

References Cited in the file of this patent

UNITED STATES PATENTS

| | | |
|---|---|---|
| 2,062,356 | Farr | Dec. 1, 1936 |
| 2,615,793 | Weedman | Oct. 28, 1952 |
| 2,617,274 | Schmidt | Nov. 11, 1952 |